(12) United States Patent
Stickle

(10) Patent No.: US 10,560,353 B1
(45) Date of Patent: Feb. 11, 2020

(54) DEPLOYMENT MONITORING FOR AN APPLICATION

(71) Applicant: Amazon Technologies, Inc., Seattle, WA (US)

(72) Inventor: Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 619 days.

(21) Appl. No.: 14/488,120

(22) Filed: Sep. 16, 2014

(51) Int. Cl.
*H04L 12/26* (2006.01)
*H04L 12/911* (2013.01)
*H04L 29/08* (2006.01)

(52) U.S. Cl.
CPC .............. *H04L 43/08* (2013.01); *H04L 47/70* (2013.01); *H04L 67/10* (2013.01)

(58) Field of Classification Search
CPC ... H04L 41/5058; H04L 43/045; H04L 67/16; H04L 67/22; H04L 67/10; H04L 43/08; H04L 47/70; H04L 65/4061; G06F 9/4401; G06F 9/5072; G06N 99/005; G06N 20/00
See application file for complete search history.

(56) References Cited

U.S. PATENT DOCUMENTS

| | | | |
|---|---|---|---|
| 8,935,563 B1* | 1/2015 | Rajaa | G06F 11/0709 714/4.11 |
| 9,148,460 B1* | 9/2015 | Sun | H04L 63/0815 |
| 2009/0143761 A1* | 6/2009 | Cantor | A61N 1/044 604/501 |
| 2009/0158275 A1* | 6/2009 | Wang | G06F 9/5077 718/1 |
| 2012/0147784 A1* | 6/2012 | Guo | H04L 49/357 370/254 |
| 2012/0221700 A1* | 8/2012 | Dutta | H04L 43/0817 709/223 |
| 2013/0145463 A1* | 6/2013 | Ghosh | G06F 21/56 726/22 |
| 2013/0232463 A1* | 9/2013 | Nagaraja | G06F 8/61 717/101 |
| 2014/0059395 A1* | 2/2014 | Mahindru | G06F 11/07 714/48 |
| 2014/0149400 A1* | 5/2014 | Fu | G06F 17/30575 707/723 |
| 2014/0156846 A1* | 6/2014 | Stern | H04L 29/0899 709/226 |
| 2014/0280913 A1* | 9/2014 | Karren | H04W 4/001 709/224 |
| 2014/0337837 A1* | 11/2014 | Padala | G06F 9/5072 718/1 |

(Continued)

*Primary Examiner* — Vivek Srivastava
*Assistant Examiner* — Muhammad Raza
(74) *Attorney, Agent, or Firm* — Thorpe North & Western, LLP.

(57) ABSTRACT

Technology for provision and use of computing resource management is provided. In one example, a method may include initiating a computing resource for use by an application distributed across a plurality of computing resources and obtaining an identifier for the application at the computing resource. The computing resource may be registered with a deployment state service configured to monitor deployment of the plurality of computing resources for the application. Metrics for the computing resource over time may be associated with the application using the identifier.

19 Claims, 7 Drawing Sheets

(56) References Cited

U.S. PATENT DOCUMENTS

| | | | | |
|---|---|---|---|---|
| 2014/0372533 | A1* | 12/2014 | Fu | H04L 67/10 709/204 |
| 2015/0058265 | A1* | 2/2015 | Padala | G06N 99/005 706/12 |
| 2015/0106804 | A1* | 4/2015 | Chandrashekhar | H04L 45/741 718/1 |
| 2015/0154039 | A1* | 6/2015 | Zada | G06F 9/5011 718/1 |
| 2015/0242204 | A1* | 8/2015 | Hassine | H04L 67/00 717/121 |
| 2015/0281048 | A1* | 10/2015 | Agarwal | H04L 45/44 370/236 |
| 2015/0378700 | A1* | 12/2015 | Rachamadugu | G06F 8/60 717/120 |
| 2015/0378743 | A1* | 12/2015 | Zellermayer | G06F 9/4401 713/2 |
| 2016/0055045 | A1* | 2/2016 | Souza | G06F 11/0712 714/57 |

\* cited by examiner

DEPLOYMENT MONITORING FOR AN APPLICATION

BACKGROUND

Applications and computing services are often made available over the Internet or other computer networks. Content providers, application providers, and/or computing service providers often utilize remote computing services to providing access to electronic resources, such as databases or web services. Electronic resources may include processing services, memory services, storage services, networking services and generally any computing services supported by hardware that is used in a computing environment. Often hardware and/or software used to support the desired services are dynamically scalable to meet the changing load for the services at any given time. Users, for example, may rent, lease, or otherwise pay for access to networked computing resources and computing services, and thus reduce the burden of providing local hardware and/or software for computing services, as compared with implementations without network accessible computing services.

To facilitate increased utilization of network accessible computing resources provided via a data center, virtualization technologies can allow a single physical computing machine to host one or more instances of virtual machines that appear and operate as independent machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. Each virtual machine or computing instance may also host one or more applications (e.g. distributed applications) that provide services to customers. As the scale and scope of data centers has increased, the task of provisioning, administering, and monitoring the physical and virtual computing resources of the data center has become increasingly complicated.

DETAILED DESCRIPTION

Figure 1:
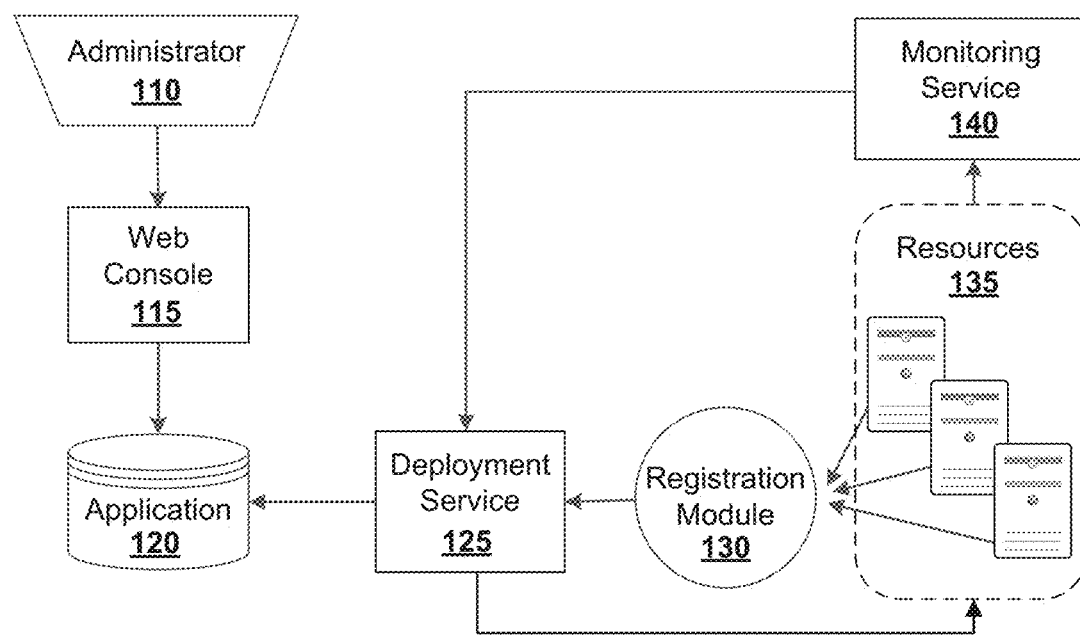
FIG. 1 is a block diagram of a system for managing application resources in accordance with an example of the present technology.

Technology for the provisioning and use of computing instances, servers, software services or resource deployment is provided. In one example, a method may include initiating a computing instance for use by an application. The application may be a distributed, polymorphic application distributed across any number of computing instances. The method may further include retrieving an identifier for the application at the computing instance. The identifier may be a unique, canonical identifier. The computing instance may be registered with a deployment state service for the application. The deployment state service may be configured to monitor deployment of the computing instances for the application. Metrics for the computing instance (or computing instances) over time may be associated with the application using the identifier.

In a more specific example, a method may include initiating a server or computing instance for an application. The application may be a polymorphic application and the application may be distributed across multiple computing instances. A polymorphic application may have multiple computing instances or servers upon which an application is running and multiples services on each computing instance. Further, the polymorphic application may have changes made on a regular basis to the types of functionality or services executing on a computing instance, the number of services executing on a computing instance, the number of computing instances that are being used by the application, the types of computing instances upon which the application is running and changes to other resources used by the polymorphic application. The application may generally have a longer lifespan than the computing instances. A unique identifier for the application may be provided for the computing instance. The unique identifier may have a longer lifespan than the computing instances. In other words, the unique identifier may persist longer than the computing instances and may optionally persist as long as the application persists. The computing instance may register with a deployment state service configured to monitor deployment of the computing instances for the application. Metrics for the computing instances collected over time may be associated with the application using the identifier. The computing instance may be deregistered with the deployment state service at some point. For example, the computing instance may be deregistered prior to termination of the computing instance.

Internet or "cloud" technologies are enabling applications that are dynamic in nature. Enterprise applications used in the past have had a well-defined deployment architecture and a fixed number of long running software processes. However, emerging applications may be much less static and structured. For example, an average lifetime of a computing instance for a large-scale application may be about two days for some applications. One side effect of use of such applications is that the limited lifespan of the computing instances upon which the application resides may be an effective mitigation to advanced persistent threats (APT). For example, by frequently re-imaging computing instances (e.g., virtual machines), the computing instances may be continually up-to-date and attackers are less likely to know what is running on a given computing instance and are less likely to establish persistent threats.

Applications using limited lifetime resources may have a set of capabilities, where an implementation of the capabilities is polymorphic in nature. As a result, an application may have a web server layer defined, where a size of the web server layer fluctuates over time or which is variable. In other words, the application may utilize a variable size server layer where the number of web servers varies over time. The implementation may change dynamically as well. For example, where an nginx web server is deployed and a security vulnerability is discovered in the server, a Jetty server may be deployed as a temporary replacement for the nginx server with the same capabilities, but without the vulnerabilities.

While there are benefits to this approach for building and operating applications, there are challenges also. For example, performance monitoring may be difficult when the application is not well defined and not static. Traditional monitoring tools install agents on static hosts which collect metrics which can be used to spot bottlenecks in the infrastructure (e.g., the computing instance or services) and trigger alarms specific to the computing instance. Existing monitoring tools are generally geared towards monitoring individual computing instances, even when monitoring a large number of such individual computing instances. The structure of an application running on the computing instances, and how this structure relates to performance is less difficult to monitor where the structure of the application, the processes of the application, the computing instances deployed for the application, etc. are largely static. However, when the life span of a computing instance for hosting the application is reduced to 1-2 days (or less) understanding the structure of the application at any one point in time becomes more difficult.

For example, users may have reported a performance problem from the previous night at 7 PM EDT. While conventional monitoring tools may indicate how individual computing instances (e.g., servers) performed at the time of the performance problem, such tools do not provide information such as: the number of instances of the web tier that were running; the number of instances of the distributed database that were running; what the collective CPU utilization for the database servers was during this time; what services were operational and so forth. The present technology enables monitoring of this information in order to better understand application performance and resource usage even when the lifespan of the resources (e.g., computing instance, database server, etc.) is short.

FIG. 1 illustrates a block diagram of high level subsystems for managing computing resources 135 for an application 120. The application 120 data store may include a description of the application or metadata for the application running on the computing resource 135. The system may include a service, such as a deployment state service (or simply deployment service 125), that may be used to specify an application 120 and record a deployment state of the application 120 across computing resources 135 at arbitrary points in time. The system may enable an administrator 110 to know the structure of the application 120 at any given time and may provide a way to correlate monitoring data at any point in time with this structure.

The system may include any number of computing instances or other computing resources 135. These computing instances may register with an endpoint of the deployment service 125 through a registration module 130 in order to be associated with the application 120. The registration module 130 may be a part of the deployment service 125 or the registration module may be separate as illustrated. A daemon for the application 120 on a computing instance may interact with the deployment service.

The system may include a web console 115 for an administrator 110 to interact with the application 120. The application 120 may be implemented (e.g. executed) over any number and/or variety of computing resources 135. Through the web console 115, the administrator 110 may be enabled to manually configure the application 120. The administrator 110 may further be enabled to view the application 120 structure (e.g., the deployment configuration of computing resources 135) for the application 120 at any given time based on the registration of the computing resources with the deployment service 125.

The web console 115 may be used to manually configure the application 120 and to define tiers of a multi-tier application 120 with the deployment service 125. Each of the tiers may be distributed to different places in a network. For example, in a three-tier architecture a user interface (e.g., for presentation to a user), functional process logic (e.g., business rules), and computer data storage and data access may be developed and maintained as independent modules and may be on separate computing resources 135. The number, type and configuration of the tiers may be defined by the administrator 110.

The deployment service 125 may assign a canonical, unique identifier to the application 120 or to a specific tier of the application 120. This identifier may be assigned to each computing instance or computing resource 135. When a computing instance or server is instantiated, the computing instance may self-register with the service 125 and pass meta-data for the computing instance to the deployment service 125. In turn, the deployment service 125 may pass the unique identifier to the computing instance. The deployment service 125 may thus be enabled to track deployment of computing resources 135 being utilized by an application at any given time through the self-registration. These resources 135 may also be configured to self-deregister with the service 125 when the instance is to be terminated and/or refreshed or recycled.

The service 125 may be able to track the application 120 structure for each tier of the application 120. By passing the unique identifier to the instances, this identifier may be associable with other metric data for the computing instances provided through previously existing monitoring technologies. By associating the identifier with the metrics, an administrator 110 may be provided with a larger-scale perspective of performance of the application 120 across the computing resources 135. Metrics for the individual resources may be compiled and/or correlated with a variable structure of the resources 135 or server layer.

The web console 115 may provide a portal by which an administrator 110 may view the structure of the application 120 at any point in time. The administrator 110 may further be enabled to view the performance of the resources 135 in the structure. The administrator 110 may also view trends in the performance of the resources 135 as the structure changes or trends in the structure as the performance of the resources 135 changes. The administrator 110 may be able to modify the application 120, define rules for constraining changes in the structure, set alerts or notifications for when certain conditions are met (such as when performance of the resources 135 or a changing structure of the application 120 meets predefined criteria, etc.), or otherwise manipulate the resources 135, deployment service 125 and/or application 120 to suit various conditions.

The system may be implemented in a service provider environment. The service provider environment may provide network-based services or computing resources. These computing services or resources provide access to a hardware substrate that is underlying the computing resources. Some example networked computing resources include a compute service, a storage service, a networking service and an I/O (Input/Output) service. For example, a computing instance may be executing on a hypervisor, which in turn executes on a hardware substrate that is server hardware.

As used herein "virtual computing" may refer to the use of computing services or resources (hardware and/or software) which may be available at a remote location from users or administrators of the computing resources and the virtual computing resources may be accessible over a network, such as the Internet. Users may be able to buy these computing resources (including storage, computing power, networking and applications) as a utility on demand and sometimes by the hour. Use of virtual computing resources can provide a number of advantages including cost advantages and/or the ability to adapt rapidly to changing computing resource needs.

The service provider environment may be a multi-tenant service provider environment, such as a "cloud" environment for example. The service provider environment may include an execution environment or a computing instance that includes an application software stack for the user's program or application together with one or more infrastructure resources for executing the user's program on the compute service. The virtualization environment or computing instance may include a user-selectable operating system (e.g., Linux, Windows, etc.), application server (e.g., Apache Tomcat), system or application configuration, etc. The virtualization environment can be configured to be accessed at a specific URL (Uniform Resource Locator). The infrastructure services can include, but are not limited to, a load balancer to distribute workload across the requested computing resources, a load scaler to scale computing resources in response to load or demand variations, a firewall or other service to control access to the computing resources, a monitoring interface that permits the user to monitor execution of applications, data storage resources (e.g., scalable volume block storage), and so forth. In some examples, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment may be capable of delivery of computing and storage capacity, as well as other computing resources, as a service to a community of end recipients. In an example implementation, the service provider environment may be established for an organization (i.e., a "customer") by or on behalf of the organization. That is, the service provider may offer a "virtual private cloud environment."

In one example, a service provider environment may include any number of server computers for a compute service. The server computers may provide computing resources for executing software or computing instances, which may also be referred to as virtual machines. A virtual machine may generally be an instance of a software implementation of a machine (i.e. a computer) that executes computer code like a physical machine.

An application may be software or a computer program, such as may be designed to help a person perform an activity. An application may manipulate text, numbers, graphics, etc. Some application packages offer focused computing functions by focusing on a single task, such as video delivery. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

Metrics data may be collected for the various computing resources 135 that have been allocated for an application 120 using a monitoring service 140. Metrics data of the computing resources may be analyzed, trended, reported, etc. to monitor the usage patterns and functioning of the computer resources. Metrics data may be collected by a metrics collector or a monitoring agent 133 (FIG. 2B), for example. Operational performance, resource utilization, demand patterns, etc. of the computer resources may be measured. In some implementations, the metrics data may be tagged as requested by a requesting user or application. The data may be tagged with the unique identifier for the application 120 or application tier. The requesting user or application 120 may request that the service provider environment add key/value pairs to the metrics data so that the tagged metrics data may later be processed. The tagged metrics data may be output to a user or a separate application.

As used herein, the term "measurement" may indicate an observed value with one or more attributes. For example, a measurement may include a name, a set of dimensions, a namespace, a unit, and/or a timestamp among possibly other (or fewer) characteristics. As used herein, the term "dimension" may be used to specify how a measurement can be aggregated, such as by InstanceID, InstanceType, Availability Zone, or other factors. As used herein, a namespace may identify the service that collected the measurement. Furthermore, as used herein, a metric may include an aggregation of measurements data.

A user may specify one or more metrics that define how the various measurements are to be aggregated. For instance, metrics data may include the same attributes as the measurements data and may be the aggregate of some or all measurements with a given name, within a given period of time. As another example, a metric may include an aggregation of some or all of the measurements in a particular namespace, or another metric can include an aggregation of some or all measurements having a particular InstanceID, etc. A metric may, in some embodiments, be an aggregation of other metrics. As a result of this flexibility, in certain embodiments, metrics may include a variety of dimensions based on the preferences of the user.

Developers and system administrators may use a monitoring service 140 to collect and track metrics, gain insight, and react promptly to keep applications and businesses running smoothly. The monitoring service 140 may monitor the computing resources 135, such as servers or computing instances, or more specifically a compute service, a storage service, a networking service, an I/O service or the like, and may also monitor custom metrics generated by a user's applications and services. The monitoring service may provide system-wide visibility into resource utilization, application performance, and operational health for computing resources 135.

The monitoring service 140 may provide a reliable, scalable, and flexible monitoring solution that may be readily implemented and used. Users may avoid the hassle of setting up, managing, or scaling their own monitoring systems and infrastructure. Using the monitoring service 140, users may monitor as much or as little metric data as desired. The monitoring service 140 may enable users to programmatically retrieve monitoring data, view graphs, and set alarms to assist in troubleshooting, spotting trends, and taking automated action based on the state of application(s) or service(s) in the service provider environment.

The deployment service 125 may have access to the metrics collected by the monitoring service 140. The deployment service 125 may be configured to correlate the metrics collected by the monitoring service 140 with the deployment of the computing resources 135 according to the canonical identifier written with the metrics by the various computing resources 135. The deployment service 125 may provide a snapshot of the present or past structure of the application based on the registration and deregistration of the various computing resources 135 along with a correlation of this structure to the performance of the computing resources 135 based on the canonical identifier.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The system of FIG. 1 may be implemented across one or more computing devices, which may be connected via a network. For example, the computing resources may host various engines and/or modules and such modules may be executable by a processor. The computing resources may be implemented as a plurality of computing nodes, each of which comprises at least one processor and a memory, where the computing nodes are configured to collectively implement the modules, data stores and so forth.

The computing resources may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 2A:
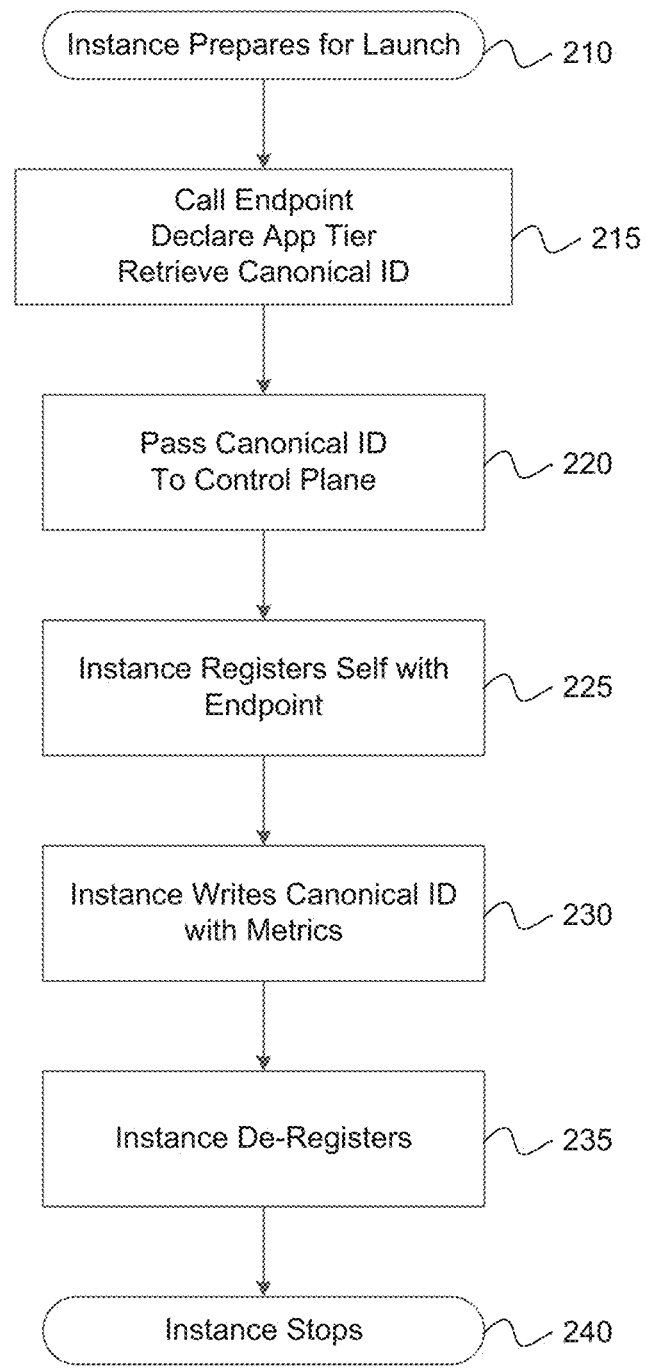
FIG. 2A is a flow diagram of a workflow for the system of FIG. 1 in accordance with an example of the present technology.

Referring to FIG. 2A, an example implementation of a workflow similar to that described above with respect to the system of FIG. 1 is illustrated as a flow diagram for a method. As a computing instance prepares for launching or for instantiation at 210, the computing instance may call the service endpoint at 215. The computing instance may declare an application or application tier (which may be a tier identifier) for which the computing instance is being linked. The computing instance may in return obtain a token from the service. The token may be the canonical or unique identifier (ID). The computing instance may pass this token to a control plane at startup at 220. The unique identifier may be written to or otherwise associated with metrics collected from the computing instance at the control plane. A daemon running on the computing instance may pass the token, along with computing instance metadata to the service endpoint to register with the service at 225. For example, the computing instance metadata may include information such as a region (e.g., a geophysical location) in which the computing instance is instantiated, a computing instance identifier, an IP (Internet Protocol) address of the computing instance, and so forth. The computing instance may make put calls to the monitoring service to report performance metrics of the instance during execution. The computing instance may use the token or canonical identifier on these put calls, or in other words may write the canonical identifier with the metrics so that the metrics may be associated with the application or application tier at 230. When the computing instance is preparing to stop or terminate, the computing instance may deregister with the service at 235. The computing instance may then stop or terminate at 240.

Figure 2B:
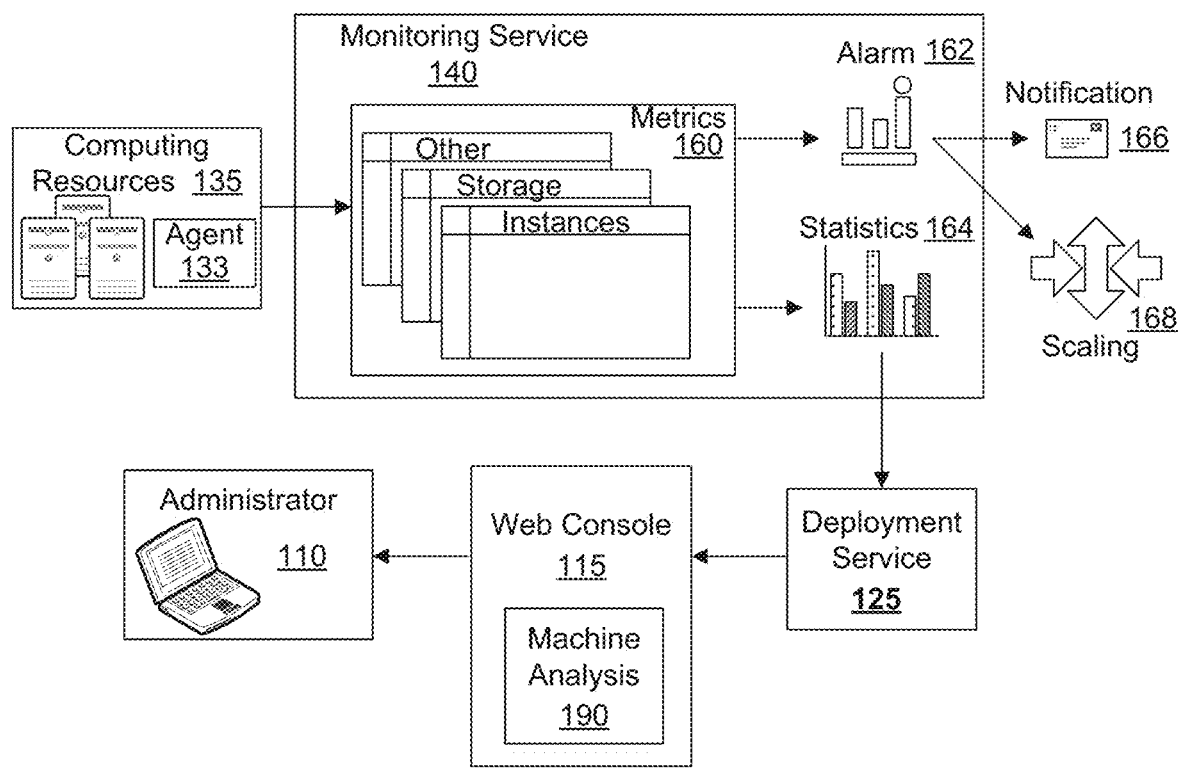
FIG. 2B is a block diagram of a monitoring service in accordance with an example of the present technology.

Referring to FIG. 2B, the monitoring service 140 may monitor service provider environment computing resources 135 as events occur, including, for example, monitoring: computing instances, storage volumes, elastic load balancers, relational database service database instances and so forth. These metrics 160 may be stored in or available through the monitoring service 140. Other metrics such as CPU utilization, latency, and request counts may be provided automatically for the computing resources 135. Users may further supply custom application and system metrics, such as memory usage, transaction volumes, or error rates, which may be monitored in the monitoring service. With the monitoring service, users may access up-to-the-minute statistics, view graphs, and set alarms for metric data. The monitoring service 140 functionality may be accessible by an administrator 110 through a web console 115, using command-line tools, using an SDK (software development kit), using an API (application programming interface), and so forth.

In one example, metrics 160 collected by the monitoring service 140 may be digested or summarized by the monitoring service 140 or the deployment service 125 for simplified viewing and/or correlation with the application structural deployment. Summarizing the metrics 160 may include, for example, eliminating extraneous data, selecting representative data points to the exclusion of other cumulative data points, selecting data from predetermined time intervals from among the monitored data, and so forth.

Summarizing the metrics 160 may reduce the data to be communicated between the monitoring service 140 and the deployment service 125, resulting in improved efficiency. A greater quantity of useful data may be transmitted with the unique identifier in a shorter time using summarized data.

The management console or web console 115 may be used by the administrator to view statistics for the collected metrics and for the variable application structure. The deployment service 125 may provide an alarm service 162 to send notifications 166 or automatically make changes to the structure (such as adding additional service provider resources by auto-scaling 168 one or more tiers of the application) of the application being monitored based on rules that are defined by the administrator. In one example, the administrator may wish to monitor CPU (central processor unit) usage and disk reads and writes for the resources in the application structure, and then use this data to determine whether to launch additional computing instances to manage increased load, or this data may be used to stop under-used computing instances to save money. The alarm service 162 may be used to stop, start, or terminate applications, processes, computing instances, and so forth when certain criteria meeting predefined rules are met. In addition, the alarms may initiate auto scaling 168 and/or notification 166 actions.

The deployment service 125 may include a data store from which administrators 110 or other statistics consumers may retrieve statistics 164 based on the recorded application structure variations and the collected metrics 160. This data may be used to calculate statistics 164 and present the data graphically through the web console 115. The web console 115 may enable the administrator to view graphs and statistics 164 for the data and view a quick overview of alarms and the application structure in one location. The web console 115 may provide a graphical user interface (GUI) by which a user may be enabled to associate the service provider environment computing resource 135 metrics 160 with the resource deployment, such as based on the unique identifier(s) included in the collected metrics.

The web console 115 may provide machine analysis 190 of statistics 164 relating to the application structure and/or metrics 160 received from the monitoring service 140. For example, business rules, scripts, machine learning and the like may be used to analyze the statistics for the presence of known or predefined issues, resource usage beyond a predetermined threshold and so forth to identify issues, problems, etc. These may be flagged in the web console 115 for the administrator 110 to review.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

The present technology may enable the definition of static identifiers for each computing resource allocated for the application. Each computing resource may self-register with the deployment service 125 for the application. The deployment service 125 may enable an abstract look at the components (i.e., computing resources) of the application and a physical look at where the application components are. The deployment service 125 enables consistent monitoring of the application over time. For example, the functional area of the application may be a database that may start to bottleneck. Using a historical look at the structure and the metrics associated with the structure, an administrator may be able to determine, for example, that on Thursday afternoons CPU (central processing unit) usage is high and will reach maximum usage at the current rate of increased usage within three weeks. The administrator may plan accordingly. The technology enables the administrator to view functional areas of the application over time even though the physical implementation of the application changes rapidly. While conventional technologies may enable a view of performance of a host or a network, the present technology enables views of information or performance about the application on the computing instances, hosts or network. The computing instance or host may change over time, such as through auto-scaling of computer resources. Databases may change from large scale relational and clustered databases to smaller-scale relational databases that are not clustered. A number of deployed computing instances may swell during the evening and diminish during the day. The present technology provides an overview of this variable structure for applications.

Figure 3:
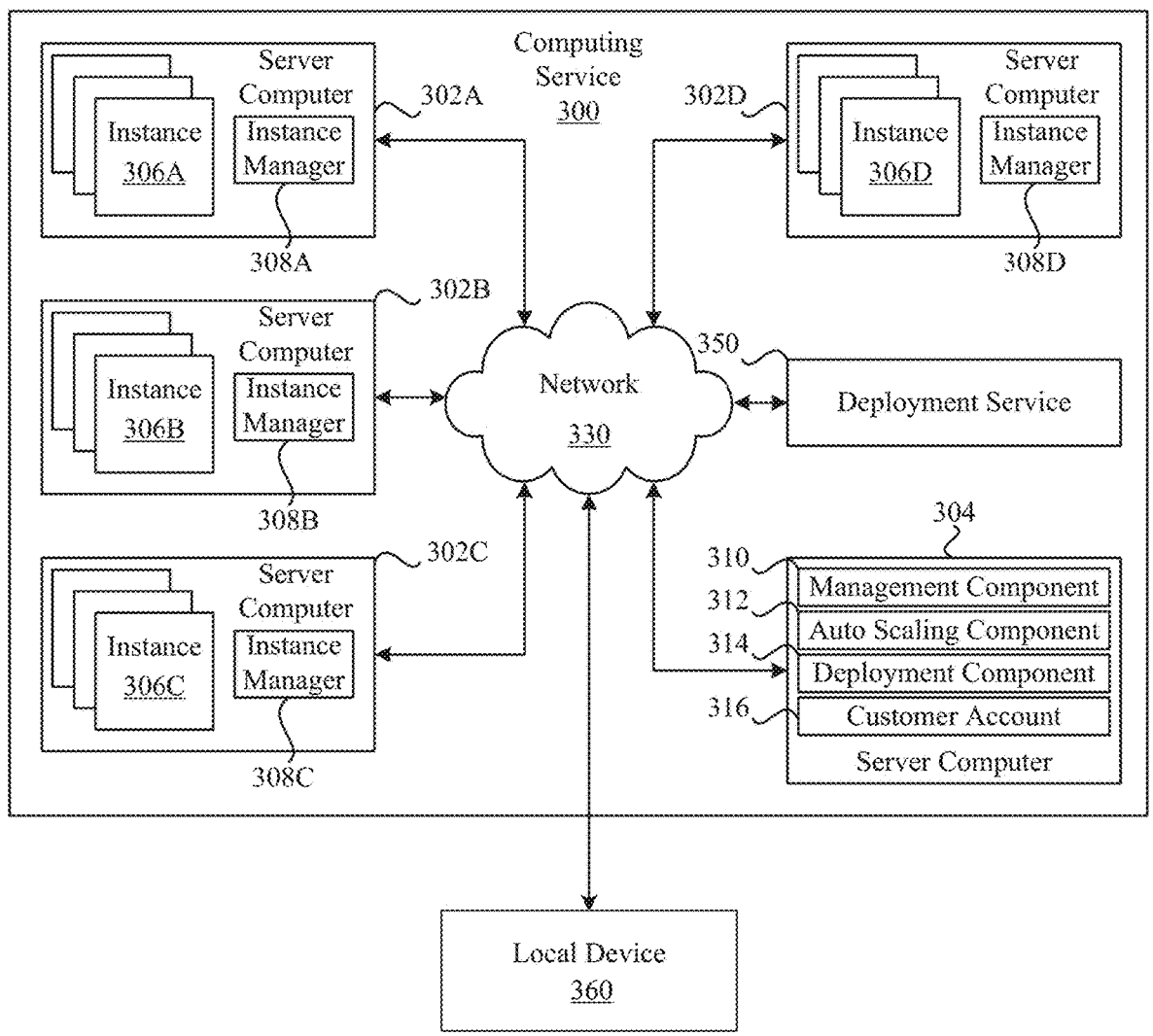
FIG. 3 is a schematic overview of a computing resource provider in accordance with an example of the present technology.

FIG. 3 illustrates how networked computing resources or services may function in a computing service 300 or a service provider environment. As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. For the IaaS model, the service provider environment may offer computers as physical or virtual machines and other resources. The PaaS model may deliver a computing platform that can include an operating system, programming language execution environment, database, and web server. Application developers may develop and run software solutions in the service provider environment without the cost of buying and managing the underlying hardware and software. The SaaS model allows installation and operation of application software in the service provider environment. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing computing instances or software instances 306A-306D. In one implementation, the instances 306A-306D may be virtual machines or computing instances. A virtual machine may be an instance of a software implementation of a machine (i.e. a computer) that executes applications like a physical machine. In the example of a virtual machine, each of the servers 302A-302D may be configured to execute an instance manager 308A-308D capable of executing the instances. The instance manager 308A-308D may be a hypervisor or another type of program configured to enable the execution of multiple instances 306A-306D on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302A-D and the instances 306A-D. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 based upon rules defined by the customer. In one implementation, the auto scaling component 312 may allow a customer to specify scale-up policies for use in determining when new instances should be instantiated and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP (Internet Protocol) addresses used to access the account, etc. Information such as the unique identifier, IP addresses used to access the account and so forth may be used in authenticating a user to the service provider environment.

A network 330 may be utilized to interconnect the server computers 302A-302D and the server computer 304. The network 330 may be a local area network (LAN) and may be connected to a Wide Area Network (WAN) so that end users may access the computing service 300. It should be appreciated that the network topology illustrated in FIG. 3 has been simplified and that many more networks and networking devices may be utilized to interconnect the various computing systems disclosed herein.

A deployment service 350 may be a service for monitoring activation and deactivation of computing resources for an application through registrations and deregistrations of these computing resources, and may further provide insight into the structure of the application and the performance of the computing resources in the structure to an administrator.

Figure 4:
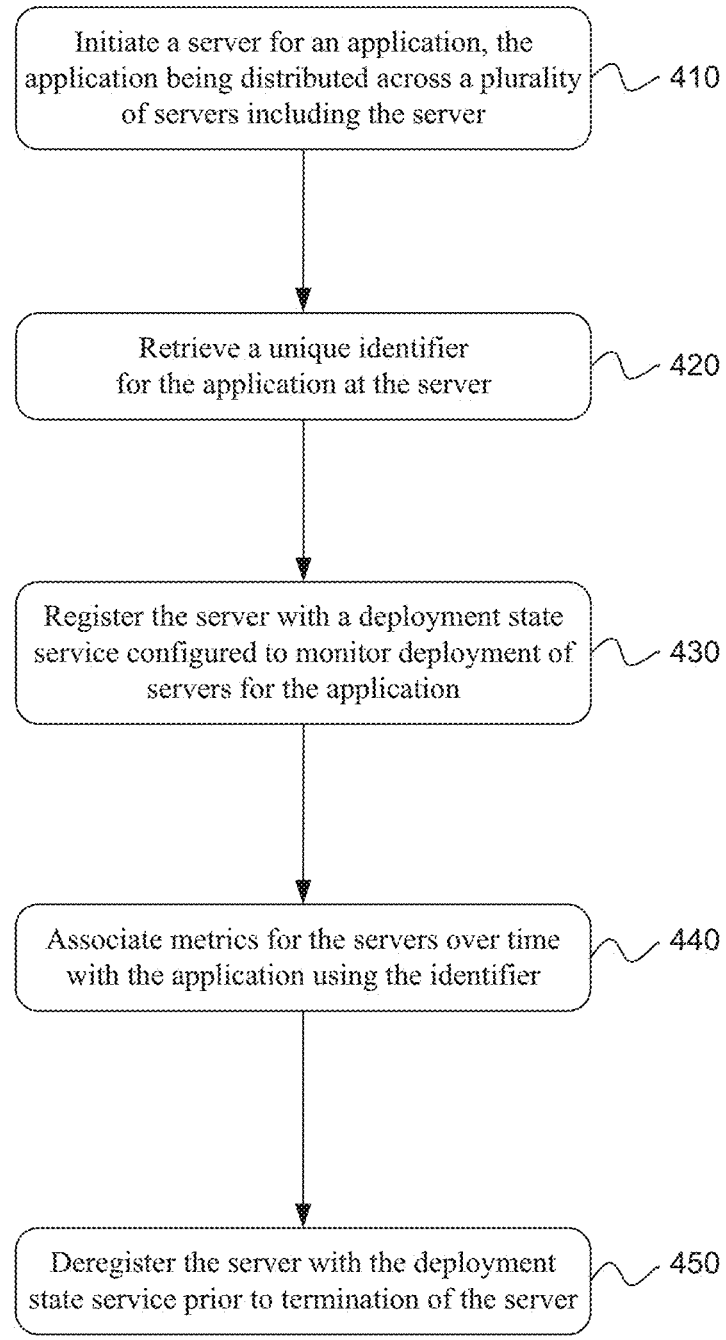
FIGS. 4-5 are flow diagrams for methods of implementing computing resource management in accordance with examples of the present technology.
Figure 5:
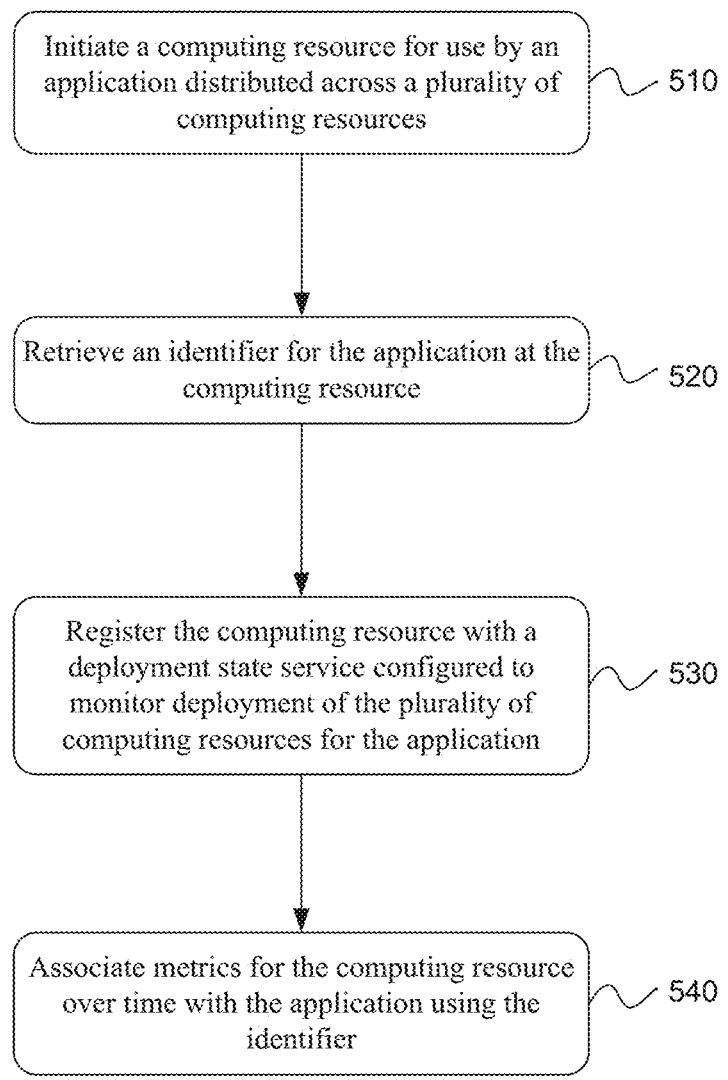

FIGS. 4-5 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 4, a flow diagram of a method is illustrated for managing computing resources for an application in accordance with an example of the present technology. The steps of this and other methods may be performed in any suitable order and is not necessarily limited to the order described or illustrated.

The method may include initiating 410 a computing instance for an application. The application may be a distributed application that is distributed across multiple computing instances. In other words, rather than one application residing on one computing instance or separate copies of the application running on separate computing instances, the application may be a single, cohesive application with different portions running on different computing instances. The application may be configured to create or replicate portions of the application for computing instances that are being instantiated. The application may be able to provide redundancy of data or processes to accommodate termination of one or more of the computing instances without degradation of performance of the application.

The method may include retrieving or obtaining 420 a unique identifier for the application at the computing instance. When the computing instance is being initiated or instantiated, the computing instance may contact a deployment service or deployment state service to notify the deployment state service that the computing instance will be used by the application. The computing instance may identify an application tier of the application. The deployment state service may send the unique identifier (e.g., the application token) to the computing instance for associating metrics from the computing instance with the application. The computing instance may send computing instance metadata (e.g., server address, server identifier, etc.) to the deployment state service to register 430 the computing instance for use with the application. The deployment state service may be configured to monitor deployment of any number of computing instances for the application. The deployment state service may use the computing instance metadata and/or the registration request to include the computing instance in the structure of the application being monitored by the deployment state service. In other words, the deployment state service may be configured to measure a state of deployment of computing instances for the application.

The method may further include associating metrics 440 for the computing instances over time with the application using the token or identifier. When metrics are collected for the computing instance, the computing instance may write the unique identifier with the metrics. In another example, the unique identifier may be passed to a control plane for the computing instance where the unique identifier may be written to or otherwise associated with the metrics collected from the computing instance by a monitoring service.

The method may also include deregistering 450 the computing instance with the deployment state service prior to termination of the computing instance. By deregistering the computing instance, the deployment state service may accurately track a number, location or other aspect of computing instances deployed for the application at any given time, and may make this information available to an administrator through a console (e.g., using a graphical user interface GUI or web console). Accordingly, the method may include creating a report of the deployment of the computing instances over time. This report may be made available to the administrator for review. Various alarms, notifications, etc. may be triggered based on the data in the report. The report may include metrics for the computing instances, representing the performance of the computing instances. By monitoring the application structure through computing instance registrations, and by associating computing instance metrics with the application or application tier using the unique identifier, the method may enable monitoring performance of the application across fluctuations in the deployment of the computing instances.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 5, a flow diagram of a method is illustrated for managing computing resources in accordance with another example of the present technology. The method may include initiating 510 a computing resource for use by an application and retrieving 520 an identifier for the application at the computing resource. The method may include registering 530 the computing resource with a deployment state service configured to monitor deployment of the plurality of computing resources for the application. Metrics for the computing resource over time may be associated 540 with the application using the identifier.

In one example, the method may include maintaining a manifest of processes executing on the computing resource. Certain processes may be expected to be present and may be trusted. However, attackers may attempt to execute other processes. These processes may be untrusted and undesirable. As a result, the method may include recycling the computing resource (such as re-imaging or re-booting a computing instance, for example) if an unexpected process is executed on the computing resource.

The method may include monitoring changes in the plurality of computing instances for the application over time and beyond termination of the plurality of computing resources using the identifier. These changes may be graphically displayed in charts, tables, graphs, etc. to an administrator via a console. Additional data regarding the system may also be graphically displayed, such as metrics associated with the application structure, physical addressing or locations for the computing resources, and so forth.

In one example, the method may include periodically sending communications from the computing resource to the deployment state service. If the computing instance fails to communicate with the deployment state service within a predetermined period of time then the computing instance may deregistered from the application by the deployment state service. This may assist in maintaining an accurate representation of the structure of the application when computing instances or other resources misbehave, become non-responsive, are compromised, etc. Along with deregistration, the computing resource may be terminated. In another example, if the computing instance fails to respond to the deployment state service within a predetermined period of time in response to periodically received communications from the deployment state service, then the computing instance may be deregistered and terminated.

Similarly as mentioned in the description of the method illustrated in FIG. 4, additional example details, operations, options, variations, etc. that may be part of the method illustrated in FIG. 5 have been described previously herein and/or are described in further detail below. Various systems, devices, components, modules and so forth for implementing the method may also be used, as described with respect to the various examples included in this disclosure.

In some examples, this or other methods described herein may be implemented wholly or partially as computer readable program code executed by a processor and the computer readable code may be embodied on a non-transitory computer usable medium.

Figure 6:
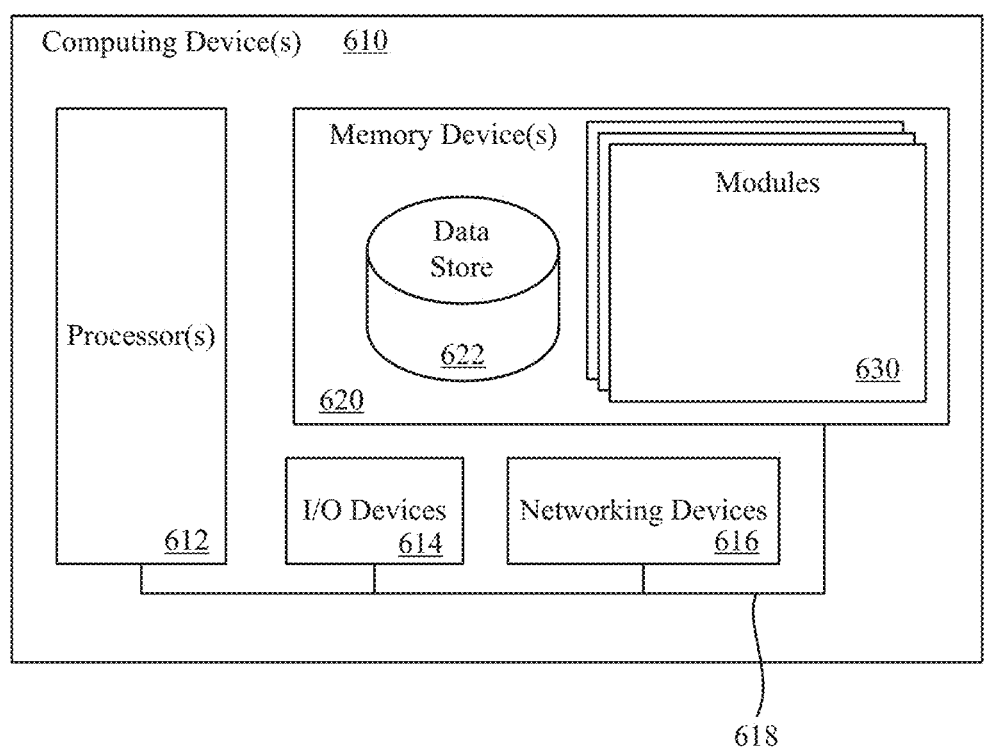
FIG. 6 is a block diagram of a computing system for implementing a resource management system in accordance with an example of the present technology.

FIG. 6 illustrates a computing device 610 on which services or modules of this technology may execute. A computing device 610 is illustrated on which a high level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain modules 630 that are executable by the processor(s) and data for the modules. A data store 622 may also be located in the memory device 620 for storing data related to the modules and other applications along with an operating system that is executable by the processor(s) 612.

The computing device 610 may further include or be in communication with a client device, which may include a display device. The client device may be available for an administrator to use in interfacing with the computing device 610, such as to review metrics, define alarms, manage resources and so forth.

Various applications may be stored in the memory device 620 and may be executable by the processor(s) 612. Components or modules discussed in this description that may be implemented in the form of software using high programming level languages that are compiled, interpreted or executed using a hybrid of the methods.

The computing device 610 may also have access to I/O (input/output) devices 614 that are usable by the computing devices. An example of an I/O device 614 is a display screen that is available to display output from the computing devices. Other known I/O device may be used with the computing device as desired. Networking devices 616 and similar communication devices may be included in the computing device 610. The networking devices 616 may be wired or wireless networking devices 616 that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor 612. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Functional units, services or the like may be implemented as a hardware circuit comprising custom VLSI circuits or gate arrays, off-the-shelf semiconductors such as logic chips, transistors, or other discrete components. Functional units, services or the like may also be implemented in programmable hardware devices such as field programmable gate arrays, programmable array logic, programmable logic devices or the like.

Functional units, services or the like may also be implemented in software for execution by various types of processors. An identified module of executable code may, for instance, comprise one or more blocks of computer instructions, which may be organized as an object, procedure, or function. Nevertheless, the executables need not be physically located together, but may comprise disparate instructions stored in different locations and achieve the stated purpose for the executables when joined logically together.

Executable code may be a single instruction, or many instructions, and may even be distributed over several different code segments, among different programs or applications, and across several memory devices. Similarly, operational data may be embodied in any suitable form and organized within any suitable type of data structure. The operational data may be collected as a single data set, or may be distributed over different locations including over different storage devices.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer implemented method, comprising:
under control of one or more computer systems configured with executable instructions,
initiating a computing instance for an application having multiple tiers, the application being distributed across a plurality of computing instances including the computing instance, wherein the computing instance is associated with an application tier for the application;
providing a unique identifier for the application at the computing instance from a deployment state service, wherein the unique identifier persists after the computing instance is deregistered with the deployment state service;
registering the computing instance with the deployment state service using the unique identifier, wherein the deployment state service is configured to monitor deployment of computing instances for the application in a service provider environment through computing instance registrations and changes in deployment of the computing instance;
transmitting a computing instance address and the unique identifier for the computing instance to the deployment state service when registering the computing instance;
monitoring metrics for the plurality of computing instances over time associated with the application through computing instance registrations and across changes in deployment of the computing instances using the unique identifier, the metrics including data regarding a number of computing instances running for each of the multiple tiers for a time period; and
changing the structure of the application via the deployment state service by adding or removing computing instances from the application tier based in part on the metrics and based in part on rules defined by an administrator.

2. The method of claim 1, further comprising creating a report of the deployment of the computing instances over time.

3. The method of claim 1, further comprising monitoring performance of the application across changes in the deployment of the computing instances.

4. A computer-implemented method, comprising:
under control of one or more computer systems configured with executable instructions,
initiating a computing resource for use by an application, the application having multiple tiers, wherein the application is implemented across a plurality of computing resources;
providing, by a deployment state service, an identifier to the computing resource based in part on an application tier assigned to the computing resource, wherein the identifier persists after the computing resource is deregistered with the deployment state service;
registering the computing resource with the deployment state service, the deployment state service being configured to monitor deployment of the plurality of computing resources for the application in a service provider environment through computing resource registrations and changes in deployment of the computing resource using the identifier, including data regarding the number of computing resources running for each of the multiple tiers for a time period;
transmitting a computing resource address and the identifier for the computing resource to the deployment state service when registering the computing resource;
associating metrics for the computing resource over time with the application using the identifier;
processing the metrics for the plurality of computing resources at the deployment state service; and
changing the structure of the application via the deployment state service based in part on the metrics and based in part on rules defined by an administrator by adding additional computing resources to one or more tiers of the multiple tiers.

5. The method of claim 4, further comprising passing the identifier to a control plane for a service provider environment from the computing resource for associating metrics generated by the computing resource with the application.

6. The method of claim 4, further comprising maintaining a manifest of processes executing on the computing resource and recycling the computing resource if an unexpected process is executed on the computing resource.

7. The method of claim 4, wherein the computing resource is a compute server.

8. The method of claim 4, wherein the computing resource is a data store server.

9. The method of claim 4, further comprising graphically displaying physical addressing and metrics for the computing resource.

10. The method of claim 4, further comprising monitoring changes in the deployment of the plurality of computing resources for the application over time and beyond termination of the plurality of computing resources using the identifier.

11. The method of claim 4, further comprising periodically receiving communications from the computing resource to the deployment state service, wherein the deployment state service is configured to deregister a first computing resource when the deployment state service fails to receive communications from the first computing resource within a predetermined period of time.

12. The method of claim 4, further comprising periodically receiving communications from the deployment state service at the computing resource and responding to the communications, wherein the computing resource is deregistered by the deployment state service when the computing resource fails to respond to the deployment state service within a predetermined period of time.

13. The method of claim 4, further comprising deregistering the computing resource with the deployment state service prior to termination of the computing resource.

14. A non-transitory computer-readable medium comprising computer-executable instructions which, when executed by a processor, implement a system, comprising:
- a variable size server layer configured to execute an application organized into multiple tiers in a service provider environment;
- a deployment state service configured to monitor the deployment state of the variable size server layer, wherein the deployment state service is further configured to associate an identifier for a tier of the application with identifiers for servers linked to the tier of the application wherein the identifier for the tier of the application persists after the variable size server layer is deregistered with the deployment state service, and configured to associate and process metrics for the servers including data regarding a number of servers running for each of the multiple tiers for a time period and to change the structure of the application based in part on the metrics and based in part on rules defined by an administrator by adding additional service provider resources within the service provider environment; and
- a registration module configured to register servers in the variable size server layer with the deployment state service to enable the deployment state service to monitor the deployment state, wherein an address and the identifiers for the servers are transmitted to the deployment state service when registering the servers,
- wherein the metrics are monitored for the servers through server registrations and across changes in deployment of the servers using the unique identifier.

15. The computer-readable medium of claim 14, further comprising a monitoring service to monitor and collect metrics for the servers in the variable size server layer for association with the application.

16. The computer-readable medium of claim 14, wherein the identifier persists longer than the servers.

17. The computer-readable medium of claim 14, wherein an identifier for the application is provided for the servers, a lifespan of the servers in the variable size server layer is two days or less and a lifespan of the identifier is longer than the lifespan of the servers.

18. The computer-readable medium of claim 14, further comprising a web console configured to enable interaction with the deployment state service by an administrator.

19. The computer-readable medium of claim 14, wherein the registration module registers server metadata received from the servers with the deployment state service.

* * * * *